US008106618B2

United States Patent

(12) United States Patent
Fabis et al.

(10) Patent No.: US 8,106,618 B2
(45) Date of Patent: Jan. 31, 2012

(54) METHOD AND DEVICE FOR CALIBRATING A POSITION SENSOR PLACED ON A SHAFT OF A PERMANENT MAGNET SYNCHRONOUS MOTOR

(75) Inventors: Radomir Fabis, Boeblingen (DE); Marcus Heller, Farmington Hills, MI (US)

(73) Assignee: Daimler AG, Stuttgart (DE)

( * ) Notice: Subject to any disclaimer, the term of this patent is extended or adjusted under 35 U.S.C. 154(b) by 490 days.

(21) Appl. No.: 12/417,330

(22) Filed: Apr. 2, 2009

(65) Prior Publication Data

US 2010/0253258 A1 Oct. 7, 2010

(51) Int. Cl.
*G05B 11/36* (2006.01)

(52) U.S. Cl. .................. 318/661; 318/400.13; 318/609; 702/57; 702/85; 702/191; 702/69

(58) Field of Classification Search .................. 702/57, 702/191, 69, 85, 108; 318/609, 661, 400.13
See application file for complete search history.

(56) References Cited

U.S. PATENT DOCUMENTS

| | | | | |
|---|---|---|---|---|
| 5,063,454 | A * | 11/1991 | Hashimoto | 360/78.04 |
| 5,796,228 | A | 8/1998 | Kojima et al. | |
| 6,281,656 | B1 * | 8/2001 | Masaki et al. | 318/700 |
| 6,456,030 | B1 * | 9/2002 | Masaki et al. | 318/700 |
| 6,567,282 | B1 * | 5/2003 | Kikuchi et al. | 363/37 |
| 6,826,499 | B2 * | 11/2004 | Colosky et al. | 702/85 |
| 6,834,244 | B2 * | 12/2004 | Kim | 702/72 |
| 7,545,111 | B2 * | 6/2009 | Fu et al. | 318/400.23 |
| 7,659,688 | B2 * | 2/2010 | Schulz et al. | 318/807 |
| 7,679,308 | B2 * | 3/2010 | Tomigashi | 318/807 |

* cited by examiner

*Primary Examiner* — Rita Leykin

(74) *Attorney, Agent, or Firm* — Crowell & Moring LLP

(57) ABSTRACT

In a method and apparatus for calibrating a position sensor mounted on the shaft of a permanent magnet synchronous motor, to control the position of a rotor of the permanent magnet synchronous motor relative to a magnetic field produced by a stator of the permanent magnet synchronous motor, a DC test current is supplied to stator windings of the permanent magnet synchronous motor to generate a definite magnetic field. The motor speed caused by the DC test current is adjusted to zero by modifying the rotor position; and the position measured by the position sensor at zero motor speed relative to the magnetic field is used to calibrate the position sensor.

7 Claims, 1 Drawing Sheet

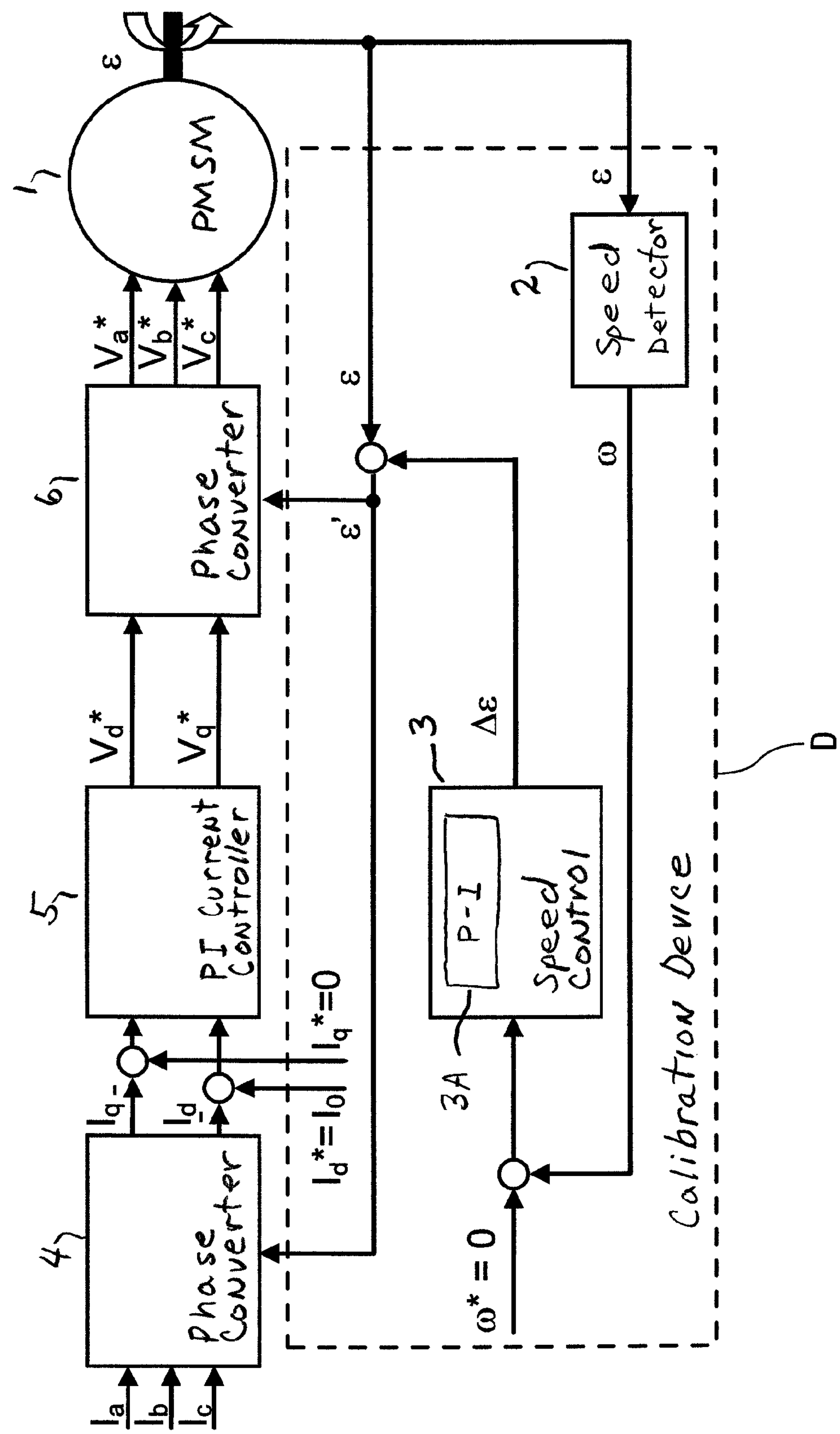
PMSM
Speed Detector
Phase Converter
PI Current Controller
P-I
Speed Control
Calibration Device
Phase Converter
1
2
3
3A
4
5
6
D

METHOD AND DEVICE FOR CALIBRATING A POSITION SENSOR PLACED ON A SHAFT OF A PERMANENT MAGNET SYNCHRONOUS MOTOR

BACKGROUND AND SUMMARY OF THE INVENTION

The present invention relates to a method and a device for calibrating a position sensor which is placed on the shaft of a permanent magnet synchronous motor in order to control the position of its rotor relative to a magnetic field produced by a stator of the permanent magnet synchronous motor.

Electric machines are key automotive components. They may be utilized as starting motors, as alternators that generate electricity from engine motion and as electric drive motors in modern hybrid electric vehicles. A permanent magnet synchronous motor (PMSM) is suited, amongst others, for use as an electric drive motor for a hybrid electric vehicle, owing to a number of advantageous attributes of a PMSM, such as high reliability and high efficiency.

The efficiency of a PMSM is highly dependent upon the position of the rotor of the PMSM relative to the magnetic field produced by the stator windings. Therefore various methods have been developed to control the relative position of the rotor and the magnetic field. In particular control methods are known that use a position sensor for detecting and controlling the position of the rotor relative to the magnetic field.

When a position sensor is used for controlling a PMSM, serving for instance as a power engine for a vehicle, a position sensor calibration procedure must usually be carried out after position sensor assembly (end of line approach) and/or with every start-up and shut-down of the vehicle. This procedure is necessary to ensure motor efficiency and to produce the commanded torque with the highest possible accuracy.

Inaccurate calibration of the position sensor can cause torque accuracy problems and reduced motor efficiency. Also unpredictable power train behavior may occur with inaccurate position sensor information.

In general position sensor calibration methods can be divided into DC current based approaches and AC current based approaches. Both approaches come with some distinct advantages and disadvantages. AC current based approaches usually do not require any PMSM rotor movement, in contrast to DC current based approaches. On the other hand, DC current based approaches usually do not cause audible noise while AC current based approaches in most cases result in at least some audible noise.

Some known DC current based methods use the fundamental electromagnetic behavior of a PMSM; that is, in a magnetic field of the stator there is a torque-free position of the rotor in which the magnetic field does not exert a torque on the rotor. However, a torque will be produced when the rotor position deviates from the torque-free position. This effect is used by DC current based methods which let the rotor move to its torque-free position in a static magnetic field generated by a DC current supplied to the stator windings of the PMSM. The supplied DC current thus fixes the torque-free rotor position, and the position measured by the position sensor when the rotor has taken its torque-free position provides an angle offset between the rotor position and the position measured by the position sensor that can be used to calibrate the position sensor.

However, such methods can cause rotor speed transients which are undesired and can excite secondary effects in a mechanical system to which the PMSM is connected. In particular this may result in overshoot and variable settling times.

U.S. Pat. No. 5,796,228 discloses a method of controlling a rotary magnet multi-phase synchronous motor and a control system based on this method using a position detector for detecting a magnet position of the synchronous motor and a drive unit for driving the synchronous motor. After the synchronous motor reaches a constant speed, current and drive voltage of the synchronous motor are measured to calculate a phase correction value between a biaxial coordinate axis based upon the installation error of the position detector and a biaxial coordinate system from conversion of a polyphase AC coordinate system based on the measured current and drive voltage, constants of the synchronous motor, and the constant speed. The rotor position of the synchronous motor is corrected based on this phase correction value.

One object of the invention is to provide an improved method and apparatus for calibrating a position sensor which is placed on the shaft of a PMSM in order to control the position of a rotor of the PMSM relative to a magnetic field produced by a stator of the PMSM.

This and other objects and advantages are achieved by the method according to the present invention, for calibrating a position sensor placed on a shaft of a PMSM in order to control the position of a rotor of the PM relative to a magnetic field produced by a stator of the PM. According to the invention, a DC test current is supplied to stator windings of the PMSM to generate a definite magnetic field, and a motor speed caused by the injected DC test current is then adjusted to zero by modifying the rotor position. The position measured by the position sensor at zero motor speed relative to the magnetic field is used to calibrate the position sensor.

This method is thus a DC current based calibration method which makes use of the torque-free rotor position in the magnetic field generated by the DC test current, as known DC current based calibration methods outlined above do as well. However, in contrast to these known methods, the rotor does not move freely to its torque-free position. Rather it is moved to the torque-free position in a controlled and smooth manner by adjusting the motor speed to zero through a corresponding active modification of the rotor position. The method according to the invention thus has all of the advantages of known DC based calibration methods while avoiding some specific deficiencies of these known methods, such as position overshooting and undesired rotor oscillations about the torque-free position.

In an advantageous embodiment of the method the motor speed is determined from signals of the position sensor. To this end it is particularly advantageous that the signals of the position sensor are differentiated with respect to time and that the motor speed is determined as an angular velocity of the rotor from the differentiated signals of the position sensor.

Using signals of the position sensor to determine the motor speed has the advantage to reduce the number of components to control the PMSM, as no sensor other than the position sensor is needed to determine the motor speed. The determination of the motor speed as an angular velocity of the rotor from the differentiated signals of the position sensor has the additional advantage that an angular velocity can be easily measured and does not depend on the dimensions of the PMSM and its components.

Furthermore, preferably the strength of the DC test current is kept constant during the adjustment of the motor speed. This fixes the magnetic field of the stator and thus the direction of the torque-free rotor position used as a reference to calibrate the position sensor and thereby advantageously simplifies the calibration of the position sensor because variations of the strength and/or direction of the magnetic field need not to be taken into account.

A device according to the invention for calibrating a position sensor placed on a shaft of a PMSM in order to control the position of a rotor of the PM relative to a magnetic field produced by a stator of the PM comprises speed detecting means to detect a current motor speed and speed controlling means to adjust the motor speed to zero by modifying the rotor position while a DC test current is supplied to stator windings of the PMSM.

In a preferred embodiment of the device the position sensor is connected to the speed detecting means and the speed detecting means is connected to the speed controlling means.

In this way signals of the position sensor can be directly supplied to the speed detecting means and signals of the speed detecting means can be directly supplied to the speed controlling means, thereby advantageously simplifying the calibration of the position sensor.

Preferably, the speed detecting means comprise a differentiator for determining a time derivative of signals of the position sensor.

By means of such a differentiator a motor speed can be determined as an angular velocity from signals of the position sensor.

Furthermore, preferably the speed controlling means comprise a proportional-integral offset-controller to modify the rotor position depending on the detected motor speed.

The use of a proportional-integral controller to adjust the motor speed to zero advantageously suppresses position sensor signal noise and thus stabilizes the adjustment of the motor speed against such noise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the following detailed description of a preferred embodiment and the accompanying drawing in which:

The single FIGURE is a block diagram of a PMSM system comprising a PMSM and a device for calibrating a position sensor placed on the shaft of the PMSM.

DETAILED DESCRIPTION OF THE DRAWING

FIG. 1 is a block diagram of a PMSM system comprising a PMSM 1 and a calibration device D for calibrating a position sensor (not shown) placed on the shaft of the PMSM 1.

The PMSM 1 of this embodiment is a three-phase PMSM powered by AC three-phase currents Ia, Ib, Ic, with a three phase/two phase converter 4 converting the three-phase currents Ia, Ib, Ic to two-phase currents Id, Iq consisting of a d-axis current Id and a q-axis current Iq of a d-q frame of reference whose d-axis is a magnetic pole axis of a magnetic field of the PMSM 1 and whose q-axis is orthogonal to the d-axis.

The PMSM system further comprises a proportional-integral (PI) current controller 5 generating a d-axis voltage command Vd* and a q-axis voltage command Vq* based on its input signals, and a two phase/three phase converter 6 converting the d-axis and q-axis voltage commands Vd*, Vq* to three-phase voltage commands Va*, Vb*, Vc* which are supplied to terminals of the PMSM 1.

The input signals of the PI current controller 5 are control errors derived from a d-axis current command Id* and the d-axis current Id and from a q-axis current command Iq* and the q-axis current Iq, respectively. The conversion of the d-axis and q-axis voltage commands Vd*, Vq* to three-phase voltage commands Va*, Vb*, Vc* involves an angle transformation according to a position control value ϵ' generated by the calibration device D described below.

The calibration device D comprises speed detecting means 2 for detecting a current motor speed ω of the PMSM 1 and speed controlling means 3 for adjusting the motor speed ω of the PMSM 1 by modifying the position of a rotor of the PMSM 1. Here and throughout this document the motor speed ω is defined as the angular velocity of the rotor.

In order to calibrate the position sensor, the d-axis current command $I_d$* is set to a constant DC test current $I_0$, while the q-axis current command $I_q$* is kept at zero. The DC test current $I_0$ will generate a magnetic field causing a torque acting on the rotor of the PMSM 1 unless the rotor is already in its torque-free position.

The motor speed ω of the PMSM 1 resulting from this torque is detected by the speed detecting means 2. To this end the speed detecting means 2 comprise a differentiator which differentiates a position signal ϵ detected by the position sensor with respect to time and determines from the differentiated signal the motor speed ω as the angular velocity of the rotor.

The motor speed ω is adjusted to zero by means of the speed controlling means 3 which serves as a controller of a control loop for the motor speed ω whose speed setpoint ω* is zero. In order to adjust the motor speed ω to zero, the speed controlling means 3 comprises a PI-offset-controller 3A which determines, depending on the motor speed ω, a position correction value Δϵ by which the rotor is to be moved. The new rotor position is then set by means of the phase converters 4, 6 and the PI-current controller 5 of the PMSM 1.

When the rotor has come to rest, the position control value ϵ' indicates an offset angle between a real zero position of the rotor in a torque-free state and a zero position assumed by the position sensor. This offset angle can further on be used to correct for the tolerances of the absolute position sensor position on the PMSM shaft and thus to calibrate the position sensor.

The calibration of the position sensor is preferentially carried out after position sensor assembly and/or with start-up or shut-down of the PMSM 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of Reference Designations in Drawing Figure

1 permanent magnet synchronous motor
2 speed detecting means
3 speed controlling means
4 three phase/two phase converter
5 proportional-integral current controller
6 two phase/three phase converter
D calibration device D
$I_a$, $I_b$, $I_c$ three-phase currents $I_d$ d-axis current
$I_q$ q-axis current
$V_d^*$ d-axis voltage command
$V_q^*$ q-axis voltage command
$V_a^*$, $V_b^*$, $V_c^*$ three-phase voltage commands
$I_d^*$ d-axis current command
$I_q^*$ q-axis current command
$I_0$ DC test current
ω motor speed
ϵ position signal
Δϵ position correction value
ϵ' position control value
ω* speed setpoint

What is claimed is:

1. A method for calibrating a position sensor mounted on a shaft of a permanent magnet synchronous motor, to control the position of a rotor of the permanent magnet synchronous motor relative to a magnetic field produced by a stator of the permanent magnet synchronous motor, said method comprising:

supplying a DC test current to stator windings of the permanent magnet synchronous motor to generate a magnetic field;

adjusting motor speed caused by the DC test current to zero by modifying the rotor position; and using the position measured by the position sensor at zero motor speed relative to the magnetic field to calibrate the position sensor, wherein the motor speed is determined from signals of the position sensor and the signals of the position sensor are differentiated with respect to time.

2. The method according to claim 1, the motor speed is determined as an angular velocity of the rotor from the differentiated signals of the position sensor.

3. A method for calibrating a position sensor mounted on a shaft of a permanent magnet synchronous motor, to control the position of a rotor of the permanent magnet synchronous motor relative to a magnetic field produced by a stator of the permanent magnet synchronous motor, said method comprising:

supplying a DC test current to stator windings of the permanent magnet synchronous motor to generate a magnetic field;

adjusting motor speed caused by the DC test current to zero by modifying the rotor position; and using the position measured by the position sensor at zero motor speed relative to the magnetic field to calibrate the position sensor, wherein the strength of the DC test current is kept constant during the adjustment.

4. Apparatus for calibrating a position sensor mounted on a shaft of a permanent magnet synchronous motor, in to control the position of a rotor of the permanent magnet synchronous motor relative to a magnetic field produced by a stator of the permanent magnet synchronous motor, said apparatus comprising:

a speed detecting device which detects current motor speed; and a motor speed controlling device for adjusting the motor speed;

wherein said motor speed control device adjusts said motor speed to zero by modifying the rotor position while a DC test current is supplied to stator windings of the permanent magnet synchronous motor, and wherein the speed detecting device comprises a differentiator for determining a time derivative of signals of the position sensor.

5. The device according to claim 4, wherein the position sensor is connected to the speed detecting device.

6. The device according to claim 4, wherein the speed detecting device is connected to the speed controlling device.

7. The device according to claim 4, wherein the speed controlling device comprises a proportional-integral offset-controller which modifies the rotor position depending on the detected motor speed.

* * * * *